United States Patent [19]
Chen et al.

[11] Patent Number: 5,826,238
[45] Date of Patent: Oct. 20, 1998

[54] DAILY TARGET GENERATION AND MACHINE ALLOCATION WITH PRIORITY

[75] Inventors: Wen-Lin Chen, San Chun; Sheng-Rong Huang, Hsin-Chu; Yi-Chin Hsu, Taipei, all of Taiwan

[73] Assignee: Taiwan Semiconductor Manufacturing, Hsin-Chu, Taiwan

[21] Appl. No.: 626,594

[22] Filed: Apr. 2, 1996

[51] Int. Cl.⁶ .................................................. A47C 17/00
[52] U.S. Cl. ........................... 705/8; 705/8; 364/468.01; 395/673; 395/674
[58] Field of Search .................... 705/8, 29; 364/468.01, 364/468.05, 468.07, 468.09; 395/673, 674, 705

[56] References Cited

U.S. PATENT DOCUMENTS

| | | | |
|---|---|---|---|
| 4,852,001 | 7/1989 | Tsushima et al. | 705/8 |
| 5,077,661 | 12/1991 | Jain et al. | 364/468.05 |
| 5,093,794 | 3/1992 | Howie et al. | 364/468.06 |
| 5,128,860 | 7/1992 | Chapman | 364/468.05 |
| 5,255,181 | 10/1993 | Chapman et al. | 364/468.05 |
| 5,291,394 | 3/1994 | Chapman | 705/8 |
| 5,325,525 | 6/1994 | Shan et al. | 395/674 |
| 5,546,326 | 8/1996 | Tai et al. | 364/552 |
| 5,612,886 | 3/1997 | Weng | 364/468.07 |

OTHER PUBLICATIONS

Electronic Manufacturing, 1991 11th IEEE/CHMT Int'l Symposium, Title: "Pull Logic Manufacturing Based on CIM".

Computer Intergrated manufacturing, 1994 International Conference. Title: Push and pull System in a dynamic environment.
Authors: Shi–Chung Chang; Loo–hay Lee; Lee–Sing Pang; Chen, T. W.–Y.; Yi–Chen Weng; Huei–Der Chiang; Dai, D.W.–h. Title: Iterative capacity allocation and production flow estimation for scheduling semiconductor fabrication. IEEE, NY, NY, USA, pp. 508–505, Oct. 2, 1995.
Author: Da–Yin Liao, Shi–Shung Chang. Title: Daily Scheduling for R&D Semiconductor Fabrication, pp. 77–82, Dec. 1993.

*Primary Examiner*—Allen R. MacDonald
*Assistant Examiner*—Romain Jeanty
*Attorney, Agent, or Firm*—George O. Saile; Stephen B. Ackerman; Graham S. Jones, II

[57] ABSTRACT

A method and system are provided for operating a data processing system including a data base computer system and a resource allocation computer for control of resource allocation in a manufacturing plant with a manufacturing line comprising a plurality of stages with manufacturing machines, the resource allocation computer including data storage means. The method includes several steps including: deriving data from the data storage means and computing the targets for each of the stages; obtaining machine capacity data from the data storage means and employing the machine capacity data for allocating machine capacity proportionally and adjusting targets; adding limits to stages of penetration and adjusting targets; determining residual capacity and allocating the residual capacity of the manufacturing machines; and checking the convergence of targets and machine allocation until convergence is achieved.

30 Claims, 6 Drawing Sheets

DAILY TARGET GENERATION AND MACHINE ALLOCATION WITH PRIORITY

BACKGROUND OF THE INVENTION

1. Field of the Invention

This invention relates to resource allocation methods and apparatus for controlling manufacturing plants, and more particularly to semiconductor manufacturing control systems.

2. Description of Related Art

Disadvantages of a current target generation systems are as follows:

1. The number of part-types has been limited with more than 20% of the lots not being directly covered.
2. There has been no differentiation of lot priorities and there has been inaccurate machine allocation and estimation of stage penetration.
3. There has been a manufacturing process with a homogeneous production rate in terms of WPH (Wafers Per Hour) of the machines over different stages.
4. Accuracy of target generation has been low.

SUMMARY OF THE INVENTION

In accordance with this invention a process is provided in which a manufacturing line is operated with the features defined by the functions or steps as follows:

1. Compute the target for each stage;
2. Allocate machine capacity proportionally and adjusting targets (according to lot priority);
3. Add limits to stages of penetration and adjust targets;
4. Allocate the residual capacity;
5. Check the convergence of targets and machine allocation until convergence is achieved.

The problem solved by this invention is as follows:

1. The accuracy of the total target is more than 95%.
2. The system is easily maintained.

In accordance with this invention, a method is provided for operating a data processing system includes a data base computer system and a resource allocation computer for control of resource allocation in a manufacturing plant with a manufacturing line comprising a plurality of stages with manufacturing machines, the resource allocation computer including data storage means. The method includes several steps including: deriving data from the data storage means and computing the targets for each of the stages; obtaining machine capacity data from the data storage means and employing the machine capacity data for allocating machine capacity proportionally and adjusting targets; adding limits to stages of penetration and adjusting targets; determining residual capacity and allocating the residual capacity of the manufacturing machines; and checking the convergence of targets and machine allocation until convergence is achieved. Preferably the method includes the steps of determining the push target, and determining the pull target. Preferably the process includes the step of determining the upper bound target; the step of determining capacity constraint and machine allocation; the step of limiting stages of penetration and the step of iterating TG&MA_PR method; and the step of executing SOPEA.

In accordance with another aspect of this invention a data processing system includes a data base computer system and a resource allocation computer for control of resource allocation in a manufacturing plant with a manufacturing line comprising a plurality of stages with manufacturing machines, the resource allocation computer including data storage means, the system includes as follows: means for deriving data from the data storage means and computing the targets for each of the stages; means for obtaining machine capacity data from the data storage means and employing the machine capacity data for allocating machine capacity proportionally and adjusting targets; means for adding limits to stages of penetration and adjusting targets; means for determining residual capacity and allocating the residual capacity of the manufacturing machines; and means for checking the convergence of targets and machine allocation until convergence is achieved.

Preferably, means are provided for determining the push target, means for determining the pull target, means for determining the upper bound target; means for determining capacity constraint and machine allocation; means for limiting stages of penetration; means for iterating TG&MA_PR system, and means for executing SOPEA.

A computer implemented method for control of resource allocation on a manufacturing line comprises a plurality of stages of manufacturing machines. The method including the steps as follows: determining the targets for each of the stages; obtaining machine capacity data and employing the machine capacity data for allocating machine capacity proportionally and adjusting the targets; adding limits to stages of penetration and adjusting the targets; determining residual capacity and allocating the residual capacity of the manufacturing machines; and checking the convergence of targets and machine allocation until convergence is achieved.

Preferably the computer implemented method includes the steps of determining the push target, and determining the pull target. Preferably the process includes the step of determining the upper bound target; the step of determining capacity constraint and machine allocation; the step of limiting stages of penetration and the step of iterating TG&MA_PR method; and the step of executing SOPEA.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

To be certain that terms used herein are defined to be interpreted with minimal confusion, a glossary is listed next.

GLOSSARY

Down-stream: Stages closer to the end of the production line.

Penetrate: Pass through a stage.

PULL: Pull wafers to the greatest degree possible from the previous stages in the fabrication line.

PUSH: Push wafers to the greatest degree possible to the next stage in the fabrication line.

SOPEA: Stages Of PEnetrAtion"

SOPEA_PR: Stage Of Penetration Estimation Method with PRiority effect

TG&MA_PR: Target Generation and Machine Allocation with PRiority effect

Upstream: Stages closer to the beginning of the production line

WIP: Work in Process

A system known as a daily Target Generation and Machine Allocation with Priority System (TG&MA_PR) provides guidelines to technicians on the shop floor for real-time dispatching of wafers to machines for processing. Targets are generated by technology, stage and priority using the PUSH and PULL procedures to maximize production movement and machine utilization and to minimize line WIP. Then, due to the limitations of machine capacity, machine allocation is considered as a factor. The target is finally modified by the concept of limiting Stages of Penetration (SOPEA). An iterative process continues until the targets converge.

The manufacturing process for integrated circuit (IC) wafer fabrication is sophisticated. The key factors in competitive IC manufacturing with high performance are usually characterized as:

1. High line yield;
2. High labor productivity;
3. High percentage of on time delivery;
4. Short production cycle time;
5. High level of equipment automation.

In a typical production-to-order type factory; short production cycle time is of primary importance. A daily "Target Generation and Machine Allocation with Priority" (TG&MA_PR) method and system reduces production cycle time. The TG&MA_PR method and system fulfill the objectives as follows:

1. effective machine utilization,
2. line balancing,
3. maximizing production move,
4. reducing WIP levels.

The TG&MA_PR method consists of two parts, one is the baseline part that computes the target and machine allocation for each production stage while the other estimates the number of fabrication stages that each batch of wafers may finish within a day.

Daily Target Generation

Figure 1:
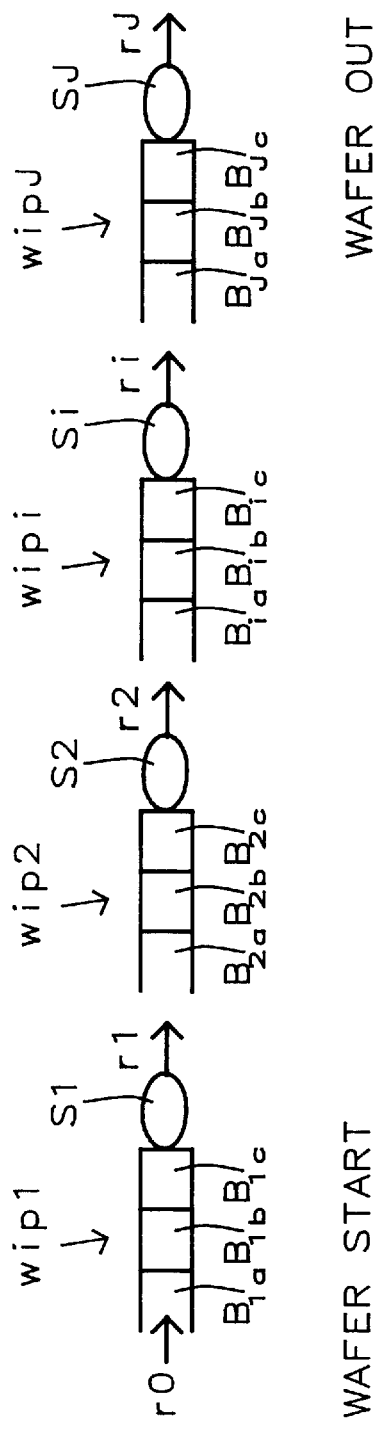
FIG. 1 shows the queuing mode for several stages in a semiconductor production line from the wafer start position to the end where the wafer out position is reached.

Consider a queuing model of the re-entrant production line in FIG. 1, where an ellipse corresponds to a server for a stage and a square box corresponds to a buffer. Although the production line of FIG. 1 appears to be a flow line, machines are shared by various stages. For example, stages 1 and j can share one machine group and stages 2 and J can share another.

FIG. 1 shows the queuing mode for several stages in a semiconductor production line wip1 wip2 wipi . . . wipJ from the wafer start position at stage wip1 to the end at state wipJ where the wafer out position is reached.

At station wip1, a set of buffers B1$a$, B1$b$, and B1$c$ are shown leading to the server S1. The output wafers r1 from stage wip1 pass to stage wip2.

At station wip2, a set of buffers B2$a$, B2$b$, and B2$c$ are shown leading to the server S2. The output wafers r2 from stage wip2 pass to stage wipi.

At station wipi, a set of buffers Bi$a$, Bi$b$, and Bi$c$ are shown leading to the server Si. The output wafers ri from stage wipi pass to stage wipJ.

At station wipJ, a set of buffers BJ$a$, BJ$b$, and BJ$c$ are shown leading to the server SJ. The output wafers rJ from stage wipJ pass out to the end of the production line.

To formalize the description of quantities on the production line, the following variables are defined:

Notations

Inputs

I: total number of part types;

J: total number of stages in global sequence;

wipj: the WIP level of stage j at the beginning of the day;

wipij: the WIP level of type-i parts at stage j at the beginning of the day, std_wipj: the standard WIP level at stage j;

A: a J*I, stage-part type mapping matrix, which its element aji=1 if type-i process goes through stage j and aji=0, otherwise;

The term aji is for a type "i" process. The stages of the process are as follows:

| Stage | aij | |
|---|---|---|
| j = 1 | ai1 = 1 | |
| j = 2 | ai2 = 0 | |
| j = 3 | ai3 = 1 | |
| j = 4 | ai4 = 0 | |
| j = 5 | ai5 = 0 | |
| j = 6 | ai6 = 1 | |
| j = 7 | ai7 = 0 | |
| . . | . . | |
| . . | . . | |
| . . | . . | |
| j = n | ain = 1, | where the stage n is an integer greater than zero and less than infinity. The product with process i will go through stages 1, 3, 6, . . . n because aij = 1 (and will not go through stages 2, 3, 5, 7, etc. because aij = 0) If we add up all of these aij values, it indicates the total number of stages that the process i will go through. |

M: the total number of machine groups;

Nm: number of available machines in group m of the day;

Cm: capacity of a machine in group m in term of wafers per day;

mj: index of the machine group required by stage j,j=1, . . . J;

$r_o$: wafers started at the beginning of the day;

$ri_o$: type-i wafers started at the beginning of the day, $d_J$: demanded of output wafers on the day, $d_{iJ}$: demanded of output wafers on the day;

Intermediate variables i: part type index, i

J: stage index, j=1, . . . J;

m: the machine group index, m=1, . . . ,M): flow_inj: number of wafers flowing to stage j from its up-stream stages, flow—in$_{ij}$: number of type-i wafers flowing to stage j from its upstream stages, flow_out$_j$: number of wafers leaving stage j to its down-stream stages, flow_out$_{ij}$: number of type-i wafers leaving stage j to its down-stream stages.

Decision variables rj: the target moves of stage j and also the flow-in to stage j+1 during the day;

r$_{ij}$: the target move of type-i parts at stage j and also the type-i flow-in to stage j+1 during the day;

ma$_j$: number of machines allocated to process stage j for the day;

ma$_{ij}$: number of machines allocated to process type-i parts at stage j for the day, The short term production control function of daily target generation and machine allocation (TG&MA) determines the target move, r$_{ij}$, and the allocation of equipment capacity, ma$_{ij}$, for every part type and every stage of the reentrant production line. Given the wafer start (ri$_o$, "∀", where "∀" means "All" i) of each day, the TG&MA function aims the multiple operation objectives as follows:

1. Maximize total moves, Σrj , while meeting daily wafer output targets set by weekly or monthly schedule, i.e., riJ≧di;
2. Minimize wafer-in-process (WIP), Σxj, and fabrication cycle times, while maintaining the standard WIP level, Wj, at stage j for "−" j;
3. Maximize machine utilization, especially for the bottle-neck machines, and
4. Balance the production line, i. e., ideally, rj=rj+1 for j=, . . . ,J−1

Objective 1 requires that the TG&MA_PR system provides a capacity for tracking the targets set by its higher level in the production control hierarchy.

The achievement of objective 2 or 3 requires that the TG&MA_PR system sets good targets to its lower level of production control on-line dispatching.

As to objective 4, line balancing is a complex issues that requires a good integration of the TG&MA_PR system with the wafer start schedule and the determination of standard.

Definition of TG&MA_PR Method

The basic TG&MA_PR method can be stated in the following steps:

Step 1. Prioritize Lots
  High Priority Lot: priority "1" in database management system
  Low Priority Lot: priority "2", "3", "4", "5" in database management system Step 2. Calculate Upper_Bound Target by technology, stage and priority Step 3. Apply TG&MA_PR to high priority lots Step 4. Apply TG&MA_PR to low priority lots using residual machine capacity Step 5. Apply SOPEA_PR to Compute Stages of penetration Flow-In Step 6. Iterate from step 2 to step 5

Step 1. Prioritize Lots

According to special orders from customers, some high priority lots must be expedited through the manufacturing production line very rapidly. Such high priority lots are assigned a priority of "1" in the control computer system to make assure that they are always handled immediately. Since high priority lots comprises only about 5% of the total number of production lots, the target system must distinguish between high priority lots and low priority lots. Accordingly, the first step of the TG&MA_PR system is to prioritize the lots so high priority lots have a priority "1" in the database management system whereas, on the other hand, low priority lots have various priority levels of "2", "3", "4" and "5".

Step 2. Calculate Upper Bound Target

Maintaining the WIP distribution of the fab at the "standard" WIP distribution is one of the objectives of TG&MA_PR . This is a fundamental priority of the TG&MA_PR system. An upper bound target for each stage is first determined by a PUSH and PULL procedure.

On the one hand, the PUSH procedure pushes the wafers at a stage except those needed for standard WIP to down-stream stages (closer to the end of the production line) so that the WIP of each stage is minimized and the throughput at each stage is maximized in a heuristic sense.

On the other hand, the PULL procedure pulls the production flows from up-stream stages, attempting to maintain the "standard" WIP level and to prevent machine starvation for each stage so that production demands can be met and machine utilization can be maximized.

Allocate standard-WIP of stage to each technology

The standard-WIP of each stage is allocated to each technology in order to calculate the Push Target and Pull Target of each technology.

$$TechStdWip = StageStdWip \times \frac{Tech(\text{Flow\_in} + WIP)}{\Sigma Tech.(\text{Flow\_in} + WIP)}$$

The Standard WIP of high priority lots is set as zero to avoid queuing in the production line.

Determining Push-target

The push-target determination procedure tries to "PUSH" as many wafers through a stage as possible while maintaining the "standard" WIP at the stage. The PUSH procedure starts from the first stage and computes the push-target for each stage as follows:

push-target$_j$ = max(0, wip$_j$ + flow_in$_j$ − std_wip$_j$);

for $i = 1, \ldots J$ where flow-in$_1 = r_o$(wafer release) and flow-in$_{j+1}$ = Target$_j(n − 1)$; for $j = 1, \ldots J − 1$ the upper index $(n − 1)$ means the previous iteration.

Determining Pull-target

This step implements the PULL concept. It determines the amount of wafers that a stage should supply to the next down-stream stage based on both the output demand and the standard WIP of that down-stream stage. The calculation procedure therefore starts from the final stage, i.e., stage J and computes the pull-target of each stage as follows:

Pull-target$_J$ = d$_J$, and
Pull-target$_j$ = max (0, flow_out$_{j+i}$ + std_wip$_{j+i}$ − wip$_{j+i}$);
  for j = J − 1, . . . , 1;
where
flow_out$_J$ = d$_J$
flow_out$_j$ = Target$_j^{(n−1)}$; for j = j, . . . , 2
the upper index (n − 1) means the previous iteration Determining Upper-bound Target To set an aggressive target for each stage, the upper-bound target of a stage without considering capacity constraint is set by taking the maximum between the Push-target and Pull-target of the stage, i.e., $UB\_target_j = \max(\text{Push-target}_j; \text{Pull-target}_j)$
Step 3. Apply TG&MA_PR to High Priority Lots
3.1 Compute upper bound of the target by stage by technology case:

|  | PUSH Target | PULL Target | Target |
|---|---|---|---|
| stage1 | 30 | 35 | 30 |
| stage2 | — | — | — |
| stage3 | 40 | 20 | 55 |
| stage4 | 60 | 55 | |

3.2 Compute the Total Target by stage case:
There are three technologies in FAB, (i.e. technology A,B,C)

|  | Tech. A Target | Tech. B Target | Tech. C Target | Total Target |
|---|---|---|---|---|
| stage1 | 30 | 10 | 20 | 60 |
| stage2 | 145 | — | 55 | 200 |
| stage3 | — | 60 | 40 | 100 |
| stage4 | 50 | 65 | — | 115 |
| stage5 | 55 | — | 25 | 80 |

3.3 Machine Allocation case:
   stage 1, 2, 3 use machine XX
   number of machine XX=4

|  | Standard Out | Max Machine Limit | Total Target |
|---|---|---|---|
| stage1 | 70 | 3 | 60 |
| stage2 | 90 | 2 | 200 |
| stage3 | 80 | 4 | 100 |

3.3.1 Change the target unit to the machine unit

The capacity of same machine would differ when involved in a different production process according to a realistic situation. Therefore, machine allocation should based on the ratio of machine unit instead of wafer quantity. In the following example, first transfer the target to machine unit. Ideally, stage1 needs 0.86 machine units stage2 needs 2.22 units and stage3 needs 1.25 units.

|  | Total Target | Standard out | Machine |
|---|---|---|---|
| stage1 | 60 | 70 | 60/70 = 0.66 |
| stage2 | 200 | 90 | 200/90 = 2.22 |
| stage3 | 100 | 80 | 100/80 = 1.25 |
|  |  |  | Total = 4.33 |

3.3.2 Proportion the machine allocation

Since the number of machines is limited, it is necessary to allocate the actual machines according to ideal machine proportions.

|  | Machine |
|---|---|
| stage1 | 4.0 * 0.86/4.33 = 0.80 |
| stage2 | 4.0 * 2.22/4.33 = 2.05 |
| stage3 | 4.0 * 1.25/4.33 = 1.15 |

3.3.3 Maximum machine limit

Due to some factors, the same kinds of machines may not appropriate for every stage. Therefore, the maximum number of available machine should be considered. The machine allocation is the minimum of the maximum machine limit and the machine allocated in 3.3.2 are as follows:

|  | Max Machine | Machine |
|---|---|---|
| stage1 | 3 | min(0.80, 3) = 0.80 |
| stage2 | 2 | min(2.05, 2) = 2.00 |
| stage3 | 4 | min(1.15, 4) = 1.15 |
|  |  | Total = 3.95 |

3.3.4 Allocate residual machine capacity

Because of the restriction of the maximum number of available machines, there is a residual machine capacity which needs to be allocated. In (3.33) four (4) machines are available-but only 3.95 machines are allocated. Therefore, 0.05 machines will be residual for further allocation. In this case, stage1 needs 0.86 units but is allocated only 0.8 units. So, there is a shortage of 0.06 units. Stage3 is 0.1 units short and stage 2 has a sufficient capacity. According to this ratio of shortages, the residual machine capacity can be allocated as follows:

|  | Residual Machine |
|---|---|
| stage1 | 0.05 * 0.06/0.16 = 0.019 |
| stage2 | — |
| stage3 | 0.05 * 0.10/0.16 = 0.031 |

3.3.5 Compute total machine allocation

We add up the numbers from (3.3.4) and (3.3.5) and the sum comprises the actual machine allocation.

|  | Machine Allocation |
|---|---|
| stage1 | 0.80 + 0.019 = 0.519 |
| stage2 | 2.00 + 0.000 = 2.000 |
| stage3 | 1.15 + 0.031 = 1.181 |

3.3.6 Compute target

Finally the machine units are transferred into actual wafer quantities.

|  | Target |
|---|---|
| stage1 | 0.819 * 70 = 57.33 |
| stage2 | 2.000 * 90 = 180.00 |
| stage3 | 1.181 * 80 = 94.48 |

The machine allocation of high priority lots can be completed by following steps (3.1), (3.2) and (3.3).
Step 4. Apply TG&MA_PR to Low Priority Lots After the machine allocation of high priority lots, the machine capacity is checked. If there are residual machines, the capacity is allocated to low priority lots by following the same steps.
Step 5. Apply SOPEA_PR In the above procedures for calculating targets, the time delay of a wafer which is moving from one stage to another stage due to queuing and processing times is not accounted for. As a result, a wafer may be moved throughout the production line within a day, which is obviously not realistic.

Actually, a wafer may need about thirty-five days to move throughout a production line if account is taken of the waiting time, process time and hold time.

In order to prevent this from happening, it is required to compute the number of stages through which the initial WIP of each stage can be moved during one day. Add that sum as a constraint to the calculation of flow-in WIPs for each stage.

Details of estimating the number of stages that WIP can penetrate (pass through) in a single day "Stages Of PEnetrAtion" (SOPEA) is described in the following section. Given the SOPEA of each-stage in the line, it is possible to identify the up-stream stages whose WIP may flow into each stage j within the current day. WIPs of stage j and its up-stream stages are then summed up as an estimate of WIP penetration limit for the stage which the daily target of stage j should not exceed. Thus, all of the targets (target$_j$; j=1, ... J) are then modified.

In this section, steps referred to as SOPEA are used to estimate how many stages that wafers at each stage can penetrate within one day. The maximum number of incoming WIPs for each stage is then determined, and finally the targets are modified individually. The number of stages of penetration is a function of part type, processing time, WIP distribution, machine capacity and dispatching. In the fab, wafers of different product types (even the same product type) at the same stage can be anticipated to get different processing priority, and can be anticipated to be randomly queued in the buffer waiting for processing.

To reduce the complexity of the problem to a practical level and to focus on the key factors about a one day long penetration estimation, the assumptions are made, as follows:

1. The wafers dispatching rule is that the first work in is the work which is served first or that a "First In First Out" (FIFO) system is used.
2. Neglect consideration of the transfer time which is the time between WIP track-in machine and being processed.
3. The unit being processed being considered is a single piece, but in practice the wafers processed unit is a lot of pieces. Some machines process wafers by batch which may be seven pieces or twenty-four pieces or even more.

Wafers of different types at a stage or at another stage may compete for the same type of equipment to be processed, as different stages may use the same type of equipment in processing. The result is that the SOPEA of wafers of a given type at a stage could be greater or less due to the quantity of machine capacity allocated to process the given type at the stage. In addition, this means that the Total Processing Time ($T_{TP}$) of wafers at any stage is defined by the basic equation of the SOPEA method which is as follows:

$$T_{TP} = \frac{(\text{WIP at this stage}) * \text{Stage processing time}}{\text{Number of machines allocated.}}$$

To describe the development of SOPEA method and system, certain notation is defined. Since it considers one product type at a time in the method of SOPEA, for simply and easily capturing the ideas, the type index "i" was omitted from the latter discussion. Thus it is necessary to redefine some notation to prevent confusion with those defined in previous section and further define extra notation in the follows:

w$_j$: WIP level for type-i wafers at stage j;

C$_j$: machine capacity in terms of number of machines allocated to process type-i wafers at stage j during a day;

τ$_j$: processing time (in hours) for type-i wafers at stage j;

tjk: time needed for all the wafers for type-i at stage j to be completed at stage k, k>j. In other words, "tjk" is the time to move from stage j to stage k.

Method development

First, calculate the time needed for all wafers at one stage to be completed at the stage immediately down-stream (called the "two-stage condition") until all of those wafers are done for wafers at every stage. Then the resulting data of two-stage condition is used to calculate another time interval needed for wafers to be processed through three stages (called the "three-stage condition"). Finally these results can be converted to a general condition (n-stage condition) and the time needed to complete wafers from one stage to its n-th down-stream stage is calculated. Then an estimate is easily made as to how many stages that wafers at one stage can penetrate. A determination is made as to the maximum incoming WIPs of each stage during one day.

(I.) Two-stage case

Figure 2:
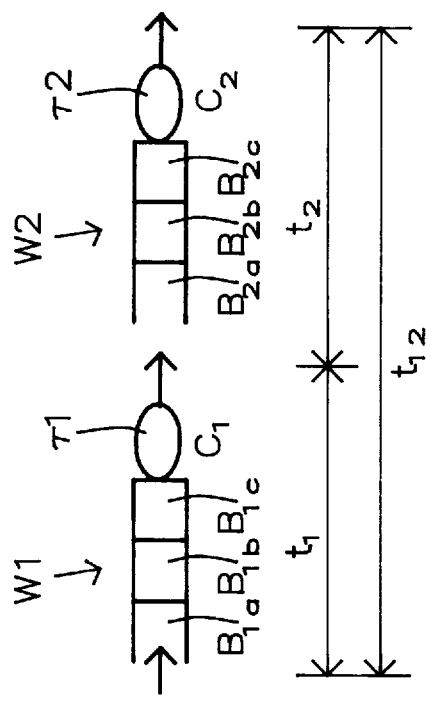
FIG. 2 shows the queuing mode for a two-stage case.

FIG. 2 illustrates the queuing mode for the two-stage case with a stage W1 and a stage W2.

At station W1, a set of buffers B1a, B1b, and B1c are shown leading to the server τ1 with machine capacity $C_1$. The output wafers from stage W1 pass to stage W2.

At station wip2, a set of buffers B2a, B2b, and B2c are shown leading to the server τ2 with machine capacity $C_2$. The output wafers from stage W2 pass to the next stage (which is not relevant to the two stage case).

Consider the following two cases:

(1) If $w_2\tau_2/C_2 > w_1\tau_1/C_1$, it means by the time when $w_2$ wafers are completed at stage 2, all $w_1$ wafers have arrived at the buffer of stage 2. Thus, $t_{12} = w_1\tau_1/C_1 + w_2\tau_2/C_2$ (2) If $w_2\tau_2/C_2 \leq w_1\tau_1/C_1$ there can be two additional subcases as follows:

(a) When the last piece of wafer is finished at stage 1, all other wafers ($w_2+(w_1-1)$) have been completed at stage 2, i.e., if $w_1\tau_1/C_1 > ((w_1-1)+w_2)\tau_2/C_2$ then $t_{12}=w_1\tau_1/C_1+\tau_2/C_2$ (b) If $w_2\tau_2/C_2 \leq w_1\tau_1/C_1 \leq ((w_1-1)+w_2)\tau_2/C_2$, then there are $w_1-(w_1\tau_1/C_1-w_2\tau_2/C_2)/(\tau_2/C_2)$ pieces remaining in the buffer of stage 2. So, $t_{12}=w_1\tau_1/C_1+w_1-(w_1\tau_1/C_1-w_2\tau_2/C_2)/(\tau_2/C_2))(\tau_2/C_2)=(w_1+w_2)(\tau_2/C_2)$ $t_{12}=(w_1+w_2)/(\tau_2/C_2)+(w_2\tau_2-\tau_1)$ Note that there cannot be any vacant time for the stage 2 machine in this subcase; otherwise it goes returns to subcase (a).

Figure 3:
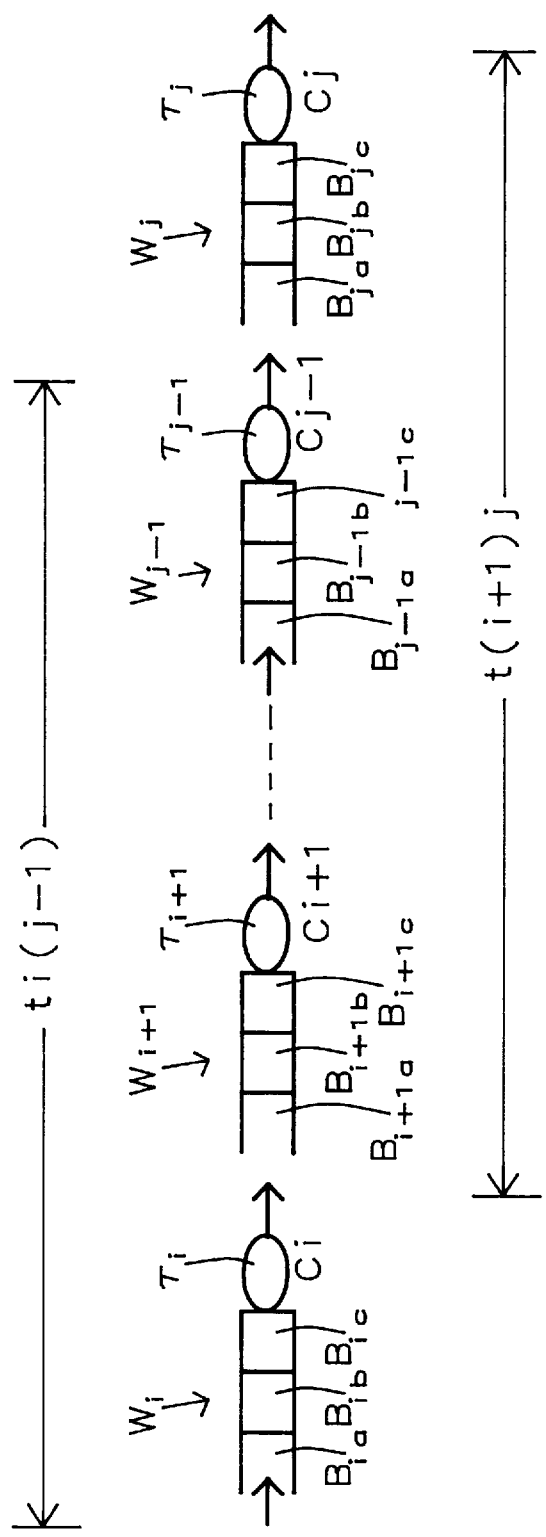
FIG. 3 shows another queuing mode.

In summary, we have the following if $w1\tau1/C1 > ((w1-1)+w_2)\tau2/C_2$, then $t12=w1\tau1/C1+\tau2/C_2$ if $w1\tau1/C1 \leq ((w1-1)+w2)\tau2/C_2$, then $t12=(w1+w_2)(\tau2/C_2$ II) General case Assume that ti(j−1) and t(i+1)j have been obtained, we can conclude the method to calculate the time need for wafers to be processed from stage i to stage j as follows:

if $t_{i(j-1)} > t_{(i+1)j}+(w_i-1)\tau_j/C_j$; $t_{ij}=t_{i(j-1)}+\tau_j/C_j$;

if $ti(j-1) \leq t_{(i+1)j}+(w_i-1)\tau_j/C_j$; $t_{ij}=t_{(i+1)j}+w_i\tau_j/C_j$;

FIG. 3 shows the queuing mode for several stages from stage i to stage j as for stage $W_i$, $W_{i+1}$, ... $\tau_{j-1}$, $\tau_j$.

At station "i", a set of buffers Bia, Bib, and Bic are shown leading to the server τi. The machine capacity at stage "i" is Ci. The output wafers from stage "i" pass to stage i+1.

At station i+1, a set of buffers Bi+1a, Bi+1b, and Bi+1c are shown leading to the server τi+1. The machine capacity at stage "i+1" is Ci+1. The output wafers from stage i+1 pass to stage j−1.

At station j−1 a set of buffers Bj−1a, Bj−1b, and Bj−1c are shown leading to the server τj−1. The machine capacity at stage "j−1" is Cj−1. The output wafers from stage j−1 pass to stage j.

At station j, a set of buffers Bia, Bjb, and Bjc are shown leading to the server τj. The machine capacity at stage "j" is Cj. The output wafers from stage j pass out to the next stage of the production line.

Following the procedures of this method development, we can use SOPEA to determine all the lead time between upper-stream and down-stream stages beginning from 2-stage condition, finally we can know the time need for wafers to be processed from any stage to its any down-stream stage. By summing up the WIPs at the stage during, and then adjust the targets in order not to exceed this quantity.

Iterative Scheme in TG&MA_PR Method

The TG&MA_PR method is intrinsically an iterative method for generating daily targets and machine allocation. Using the PUSH and PULL procedures to determine the Push_target and the Pull-target for a stage, the TG&MA_PR method uses the data of numbers of wafers flowing into and flowing out of a stage (flow_in and flow_out) individually. The flow_in data and flow_out data of a stage are just the daily targets of its upstream stage and this stage itself was determined in the previous iteration.

In the beginning for executing the TG&MA_PR method, it needs a given initial set of targets used as flow-in data and flow-out data. Then a new set of targets and machine allocation can be determined according to the PUSH and PULL procedures. As this machine allocation is determined, SOPEA can be executed then to estimate wafer penetration limits to modify the targets. These targets (after some tuning) are further used to determine new flow_in data and new flow_out data to generate daily target data and machine allocation data for the next iteration. The iteration process continues until the targets converge.

Figure 4:
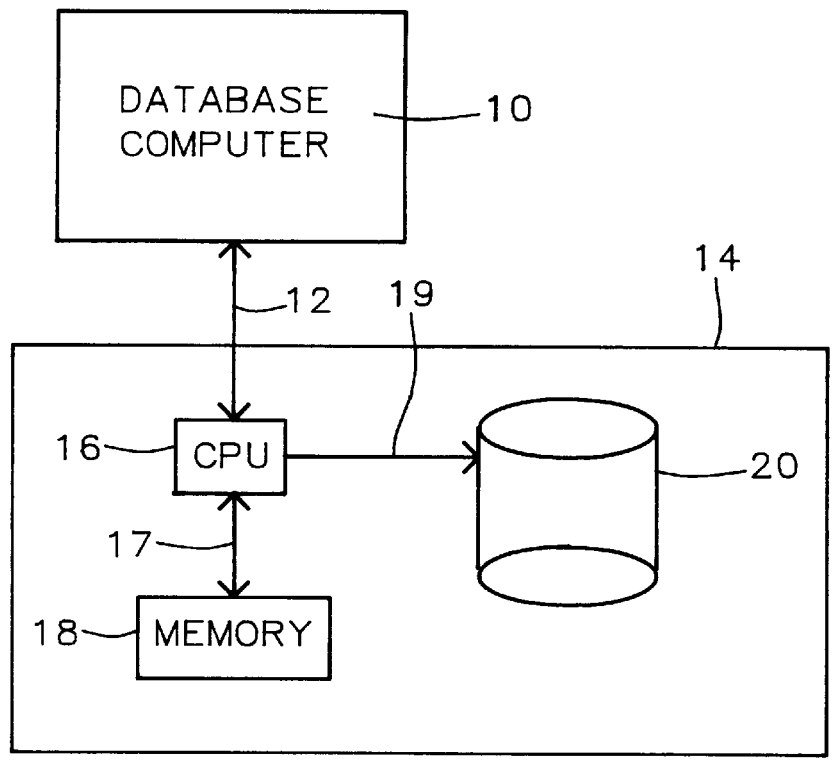
FIG. 4 shows a computer system with a database computer and a target computer in accordance with this invention.

FIG. 4 shows a computer system in accordance with this invention including database computer 10 and target computer 14. The database computer 10 contains a database system employed in operation of the system of this invention. The data from database computer 10 is supplied to the central processing unit (CPU) 16 in target computer 14. The target computer 14 includes CPU 16 and memory and direct access storage device (DASD) 20. CPU 16 is connected as follows: by cable 12 to computer 10; by cable 17 to memory 18; and by cable 19 to DASD 20.

Figure 5:
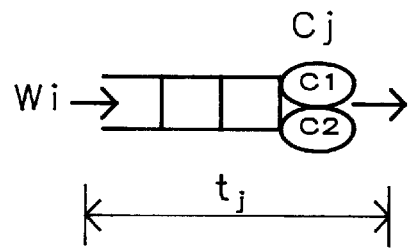
FIG. 5 shows an example of a one stage case for stage j which receives wafers wi from the preceding stage i.

FIG. 5 shows an example of a one stage case for stage j which receives wafers wi from the preceding stage i with parameters as follows:

Wj = 100 pieces (WIP at this stage)

Cj = 2 machines (machine capacity of two machines

C1 & C2 allocated to stage i)

τj = 1.5 min/piece (processing time for 1 machine)

-continued $$tj = \frac{100 \text{ pieces} * 1.5 \text{ min/piece}}{2 \text{ machines}} = 75 \text{ minutes}$$

Accordingly, 75 minutes is required to process 100 pieces through this stage given the allocation of two machines. As a result, two machines are included in the specifications which shows how the system and method of this invention are tied to physical devices.

Figure 6:
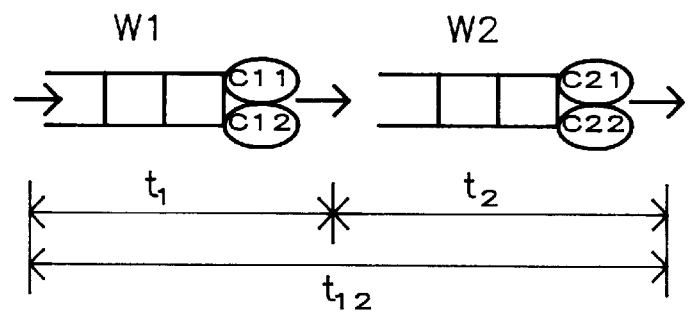
FIG. 6 shows an example of a two stage case for stages 1 and 2 for several cases.

FIG. 6 shows an example of a two stage case for stages 1 and 2 for several cases with parameters as follows:

First consider the case in which as follows:

$\tau 2 > \tau 1$

W1 = 100 pieces (WIP at this stage)

C1 = 2 machines (machine capacity of two machines allocated to stage 1)

τ1 = 1.5 min/piece (processing time for 1 machine)

$$t1 = \frac{100 \text{ pieces} * 1.5 \text{ min/piece}}{2 \text{ machines}} = 75 \text{ minutes}$$

W2 = 200 pieces (WIP at this stage)

C2 = 2 machines (machine capacity of two machines allocated to stage 2)

τ2 = 1 min/piece (processing time for 1 machine)

$$t2 = \frac{200 \text{ pieces} * 1 \text{ min/piece}}{2 \text{ machines}} = 100 \text{ minutes}$$

$$t12 = \frac{(W1 + W2) * \tau 2}{C2} = \frac{(100 + 200) * 1}{2} = 150 \text{ minutes}$$

$$\tau 1 > \frac{((W1 - 1) + W2) * \tau 2}{C}$$

W1 = 100 pieces (WIP at this stage)

C1 = 2 machines (machine capacity of two machines allocated to stage 1)

τ1 = 1.5 min/piece (processing time for 1 machine)

$$t1 = \frac{100 \text{ pieces} * 1.5 \text{ min/piece}}{2 \text{ machines}} = 75 \text{ minutes}$$

W2 = 50 pieces (WIP at this stage)

C2 = 2 machines (machine capacity of two machines allocated to stage 2)

τ2 = 1 min/piece (processing time for 1 machine)

$$t2 = \frac{50 \text{ pieces} * 1 \text{ min/piece}}{2 \text{ machines}} = 25 \text{ minutes}$$

$$t12 = t1 \frac{1 * \tau 2}{C2} = 75 + \frac{1 * 1}{2} = 75.5 \text{ minutes}$$

W1 = 100 pieces (WIP at this stage)

C1 = 2 machines (machine capacity of two machines allocated to stage 1)

τ1 = 1.5 min/piece (processing time for 1 machine)

$$t1 = \frac{100 \text{ pieces} * 1.5 \text{ min/piece}}{2 \text{ machines}} = 75 \text{ minutes}$$

W2 = 100 pieces (*WIP* at this stage)

C2 = 2 machines (machine capacity of two machines allocated to stage 2)

τ2 = 1.5 min/piece (processing time for 1 machine)

$$t_2 = \frac{100 \text{ pieces} * 1 \text{ min/piece}}{2 \text{ machines}} = 50 \text{ minutes}$$

$$t12 = \frac{(100 + 100) * 1}{2} = 100 \text{ minutes} = 1 \frac{40}{60} = 1.67 \text{ hours}$$

Thus, if t14=25.4 hours, t13=20.5 hours means the wafer can pass through three stages within one day.

Figure 7:
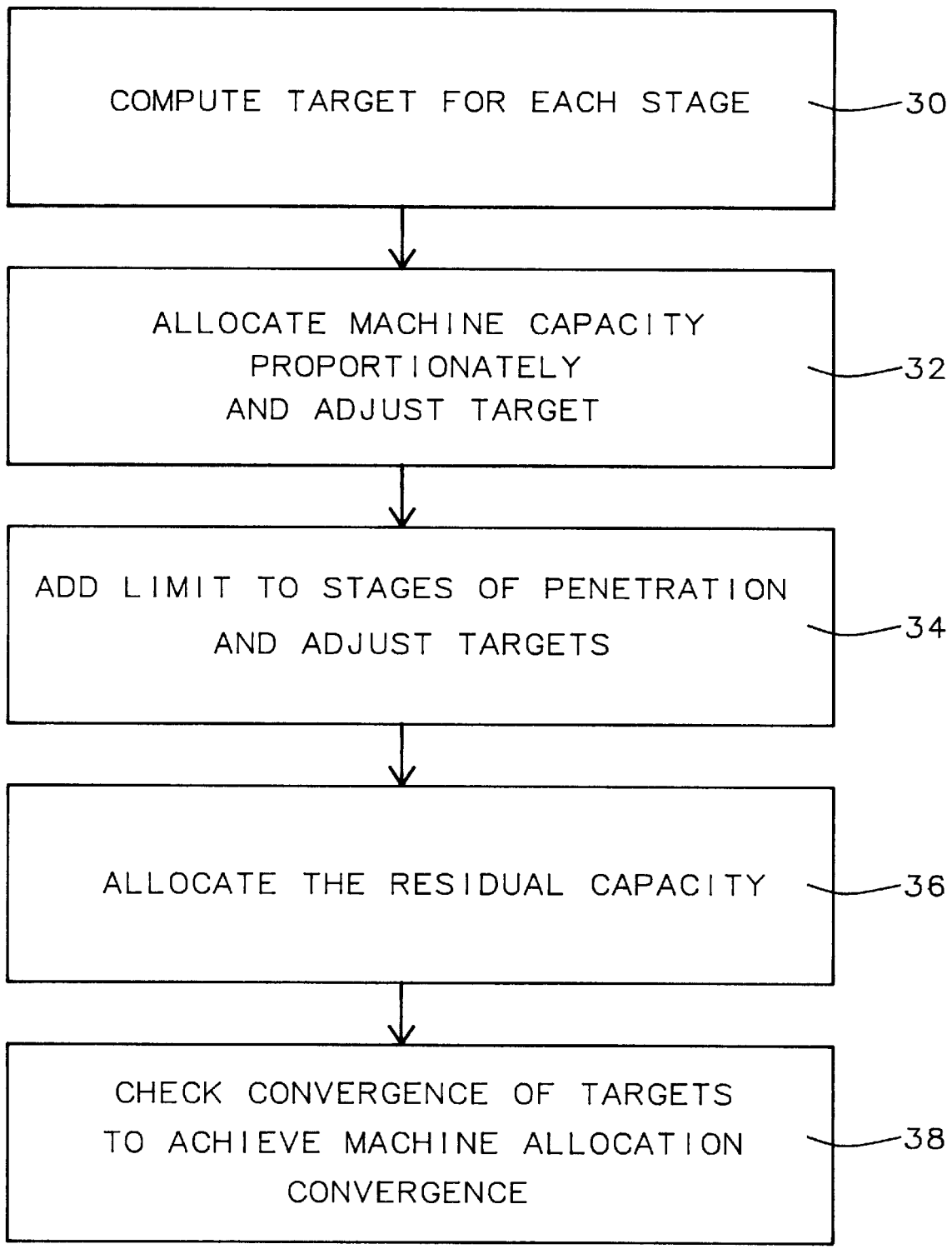
FIG. 7 shows a steps performed by computer of FIG. 4.

The computer 14 in FIG. 4 performs a sequence of steps shown in a flow chart sequence in FIG. 7.

In step 30, the computer 14 computes the target for each stage of the production line.

Following step 30, in step 32, the computer 14 allocates machine capacity proportionally and adjusts targets (according to lot priority).

Following step 32, in step 34, the computer 14 adds limits to stages of penetration and adjusts targets.

Following step 34, in step 36, the computer 14 allocates the residual capacity of the manufacturing line.

Following step 36, in step 38, the computer 14 checks the convergence of targets and machine allocation until convergence is achieved.

Features of the system of this invention are described in the following sections with reference to FIG. 8 where a sequence of steps is performed by the computer system 14 of FIG. 4.

1. Determining Push-Target

Figure 8:
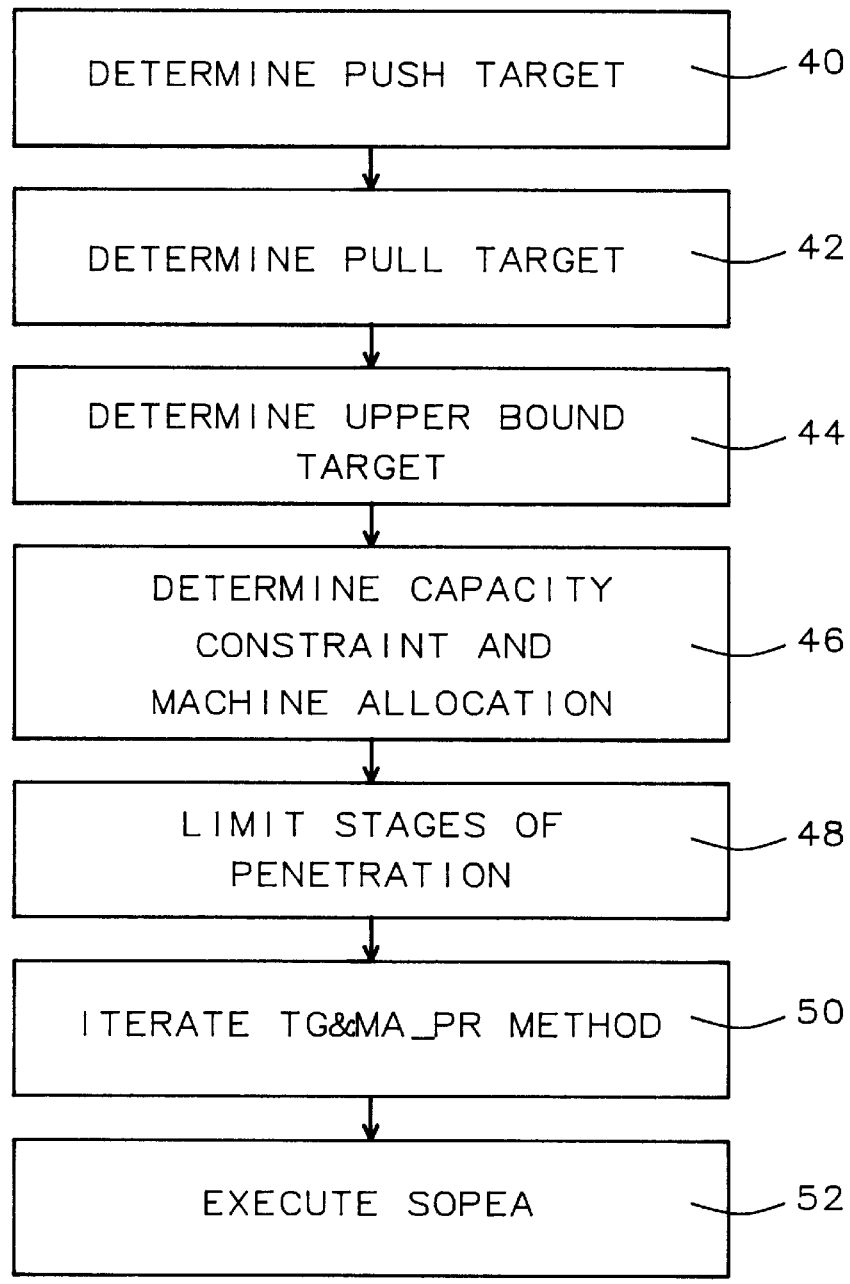
FIG. 8 shows steps performed by the computer of FIG. 4.

Referring to FIG. 8, in step 40, the push target is determined by computer 14 using the equation as follows:

Push-Target$_j$ = max(0, wip$_j$ + flow_in$_j$ − std_wip$_j$); for j = 1, ... J (1)
where: flow_in$_1$ = r$_0$ (wafer release) and
flow_in$_{j+1}$ = Target$_j$(n − 1); for j = 1, .. J − 1 and the superscript index (n − 1) refers to the previous iteration.

2. Determining Pull-Target

Referring to FIG. 8, following step 40 in step 42, the pull target is determined by computer 14 using the equation as follows:

Pull-Target$_j$ = max(0, flow_out$_{j+1}$ + std_wip$_{j+1}$ − wip$_{j+1}$) (2)
for j = J − 1, .. 1
where:
flow_out$_j$ = d$_j$ (demand for output wafers for the day) and
flow_out$_j$ = Target$_j$ (n − 1);
for j = J, .. 2 and the superscript index (n − 1) refers to the previous iteration.

3. Determining Upper-Bound Target

Referring to FIG. 8, following step 42 in step 44, the upper bound target is determined by computer 14 using the equation as follows:

UB_target$_j$=max (Pull-Target$_j$, Push-Target$_j$) (3)

4. Capacity Constraint and Machine Allocation

Referring to FIG. 8, following step 44 in step 46, the capacity constraint and machine allocation are determined by computer 14, as follows:

4.1 Apply UB-Target to high priority lots (having a higher priority of "1" in database management system).

4.2 Apply UB-Target to low priority lots (having lesser priorities of "2", "3", "4", "5" in a database management system) using the residual machine capacity.

Consider a stage j, let the set S be the collection of stages competing for machine group Mj.

$$UB - \text{Target}_j, \text{ if } \Sigma\, UB - \text{Target}_{j'} \leq C'mj, j' \in S \quad (4)$$

Target (for low priority lots) = $\begin{cases} \text{(where } C'mj \text{ is the residual machine capacity of } mj\text{)} \\ C'mjX \dfrac{UB - \text{Target}_j}{\Sigma\, UB - \text{Target}_{j'}(j' \in S)}, \text{ Otherwise} \end{cases}$ The number of machines allocated to stage j in a day is $$nj = \frac{\text{target}_j}{Cmj} \times Nmj \quad (5)$$

$$\text{Target}j = TGT_{HPL} + TGT_{LPL} \quad (6)$$

where $TGT_{HPL}$: Target for high priority lots $TGT_{LPL}$: Target for low priority lots 5. Limiting Stages of Penetration Referring to FIG. 8, following step 46 in step 48, the limits of stages of penetration are determined by computer 14, as follows:

Given the stages of penetration of each stage in the line, we can identify the up-stream stages whose Work in Process (WIP) may flow into each stage j within the day. WIPs of stage j and its upstream stages are then summed up as an estimate of the WIP penetration limit for the stage which the daily target of stage j should not exceed. So, all targets (Target j; j=1. . . J) are then modified.

At this point reference is made to FIG. 3 above where:

W$_j$: WIP level for type-i at stage j;

Cj: machine capacity in terms of number of machines allocated to process type-i wafers at stage j during a day.

τ j: processing time (in hours) for type-i at stage j;

τ jk: time, needed for all the wafers for type i at stage j to be completed at stage k, k>j.

Figure 9:
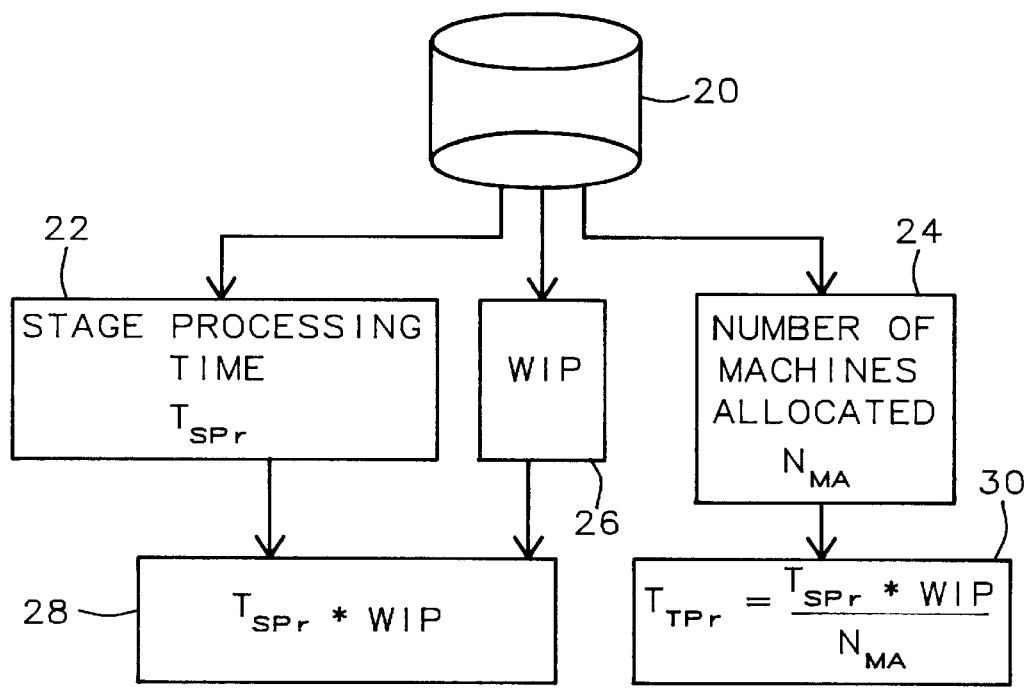
FIG. 9 shows a method and means for calculating the total processing time $T_{TP_r}$ of wafers at any stage.

Referring to FIG. 9, a method and means for calculating the total processing time T$_{TPR}$ of wafers at any stage is shown, as follows:

$$T_{TPr} = \frac{(WIP \text{ at this stage}) \times T_{SPr}}{N_{MA}}$$

where

T$_{SPr}$: stage processing time

N$_{MA}$: Number of machines allocated

Referring to FIG. 9, the stage processing time T$_{SPr}$ in block 22, WIP in block 26 and number of machines allocated N$_{MA}$ in block 24 are derived form DASD 20. In block 28, the value T$_{SPr}$ from block 22 is multiplied by the WIP value in block 26 yields the product WIP×T$_{SPr}$.

In block 30, the value of T$_{TPr}$ is calculated by dividing the value of WIP×T$_{SPr}$ in block 28 by the value N$_{MA}$ from block 24.

Figure 10:
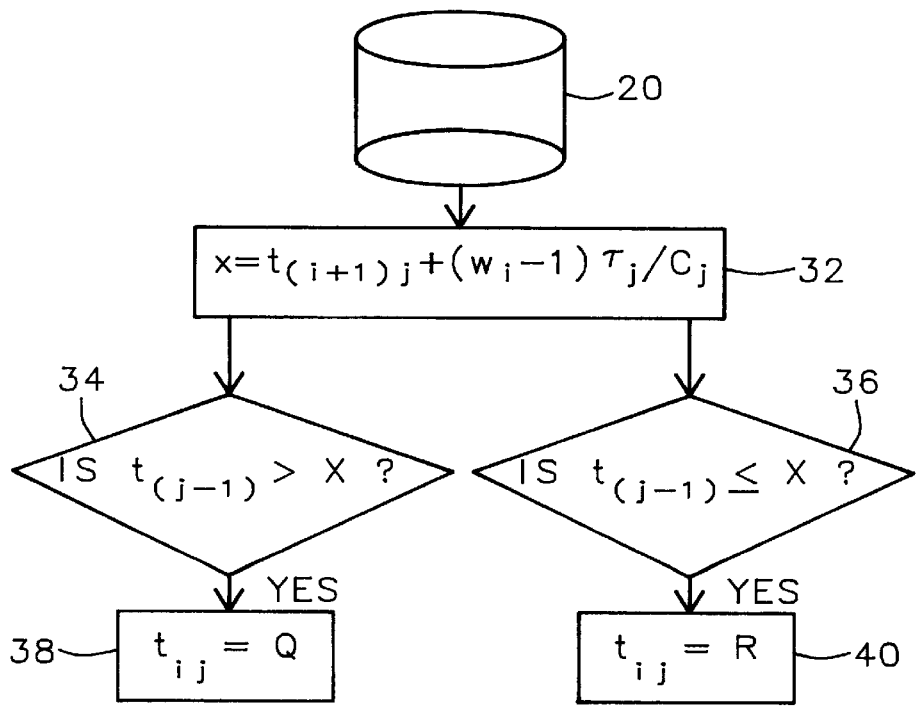
FIG. 10 shows how to determine the value of $t_{ij}$.

FIG. 10 shows the method and means for determining the value of t$_{ij}$. Block 32 determines the value x for equations (7) and (9) below by block 32 which derives data from DASD 20 to calculate x.

In equation (7) below, a test is made as shown by decision block 34 where the test is made whether $t_{i(j-1)} > x$. If so, then the result in block 38 is that $t_{ij} = Q$ which is the value in equation (8).

In equation (9) below, a test is made as shown by decision block 36 where the test is made whether $t_{i(j-1)} \leq x$. If so, then the result in block 40 is that $t_{ij} = R$ which is the value in equation (10).

When the values of $t_{i(j-1)}$ and $t_{(i+1)j}$ have been obtained, a method in accordance with this invention for calculating the time need for wafers to be processed from stage i to stage j is as follows:

$$\text{if } t_{i(j-1)} > t_{(i+1)j} + (w_i - 1)\tau_j / C_j;  \quad (7)$$

$$t_{ij} = Q = t_{i(j-1)} + \tau_j / C_j; \quad (8)$$

$$\text{if } ti(j-1) \leq t_{(i+1)j} + (w_i - 1)\tau_j / C_j; \quad (9)$$

$$t_{ij} = R = t_{(i+1)j} + w_i \tau_j / C_j; \quad (10)$$

By summing up the WIPs at the stages of penetration, an estimate is made of the maximum number of wafers that can flow into each stage during a day from 7:00 AM to 19:00 PM, every day, and then the targets are adjusted to avoid exceeding this maximum quantity.

6. Iterate TG&MA_PR Method

Referring to FIG. 8, following step 48 in step 50, the TG&MA-PR is iterated by computer 14, as follows:

In the beginning for executing TG&MA_PR, an initial set of targets as to flow-in data and flow-out data is required to determine new targets and machine allocation data according to the Push & Pull target generation procedures.

7. Determine SOPEA

Referring to FIG. 8, following step 50 in step 52, the SOPEA is determined by computer 14. As machine allocation is determined, SOPEA can then be executed to estimate wafer penetration limits for modifying the targets. These targets are further used as new flow-in and flow-out to generate daily target and machine allocation for the next iteration. The iteration continues until the targets are converged.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method of operating a data processing system including a data base computer system and a resource allocation computer for control of resource allocation in a manufacturing plant with a manufacturing line comprising a plurality of stages with manufacturing machines, the resource allocation computer including data storage means, the method including the steps as follows:

deriving data from the data storage means and computing the targets for each of the stages;

obtaining machine capacity data from the data storage means and employing the machine capacity data for allocating machine capacity proportionally and adjusting targets;

adding limits to stages of penetration and adjusting targets;

determining residual capacity and allocating the residual capacity of the manufacturing machines;

checking the convergence of targets and machine allocation until convergence is achieved, determining the push target, determining the pull target, determining the upper bound target, determining the capacity constraint and machine allocation, limiting the stages of penetration, iterating the Target Generation and Machine Allocation and PRiority (TG&MA PR), and executing the Stages Of PEnetrAtion (SOPEA) method.

2. A method in accordance with claim 1 including the steps of as follows:

determining the push target, wherein said push target is determined by computer using the equation as follows:

$$\text{Push-Target}_j = \max(0, wip_j + \text{flow\_in}_j - \text{std\_wip}_j);$$

for $j = 1, \ldots J$ (1) where: $\text{flow\_in}_1 = r_o$ (wafer release) and $\text{flow\_in}_{j+1} = \text{Target}_j(n-1)$; for $j = 1, \ldots J-1$ and the superscript index $(n-1)$ refers to the previous iteration, and determining the pull target, wherein said pull target is determined by computer using the equation as follows:

$$\text{Pull-Target}_j = \max(0, \text{flow\_out}_{j+i} + \text{std\_wip}_{j+1} - wip_{j+i}) \text{ for } j = J-1, \ldots 1$$

where: $\text{flow\_out}_j = d_j$ (demand for output wafers for the day), and $\text{flow\_out}_j = \text{Target}_j(n-1)$;

for $j = J, \ldots 2$ and the superscript index $(n-1)$ refers to the previous iteration.

3. A method in accordance with claim 2 including determining the upper bound target by computer using the equation as follows:

$$\text{UB\_target}_j = \max(\text{Pull-Target}_j, \text{Push-Target}_j).$$

4. A method in accordance with claim 2 including the steps as follows:

iterating the TG&MA_PR method comprising:

Step 1. Prioritize Lots

High Priority Lot: priority "1" in database management system

Low Priority Lot: priority "2", "3", "4", "5" in database management system,

Step 2. Calculate Upper_Bound Target by technology, stage and priority,

Step 3. Apply TG&MA_PR to high priority lots,

Step 4. Apply TG&MA_PR to low priority lots using residual machine capacity,

Step 5. Apply SOPEA_PR to Compute Stages of penetration Flow-In, and

Step 6. Iterate from step 2 to step 5.

5. A method in accordance with claim 3 including the steps of determining capacity constraint and machine allocation by computer, as follows:

applying UB-Target to high priority lots (having a higher priority of "1" in database management system), applying UB-Target to low priority lots (having lesser priorities of "2", "3", "4", "5" in a database management system) using the residual machine capacity, considering a stage j, let the set S be the collection of stages competing for machine group Mj, $$\text{Target (for low priority lots)} = \begin{cases} UB - \text{Target}_j, \text{ if } \Sigma\ UB - \text{Target}_{j'} \leq C'mj,\ j' \in S \\ \text{(where } C'mj \text{ is the residual machine capacity of } mj) \\ C'mjX \dfrac{UB - \text{Target}_j}{\Sigma\ UB - \text{Target}_{j'}(j' \in S)}, \end{cases}$$

Otherwise the number of machines allocated to stage j in a day is $$nj = \frac{\text{target}_j}{Cmj} \times Nmj$$

$$\text{Target}_j = \text{TGT}_{HPL} + \text{TGT}_{LPL}$$

where $\text{TGT}_{HPL}$: Target for high priority lots $\text{TGT}_{LPL}$: Target for low priority lots.

6. A method in accordance with claim 3 including the steps as follows:

iterating the TG&MA_PR method comprising:
Step 1. Prioritize Lots
High Priority Lot: priority "1" in database management system
Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

7. A method in accordance with claim 3 including the steps as follows:

applying UB-Target to high priority lots (having a higher priority of "1" in database management system),
applying UB-Target to low priority lots (having lesser priorities of "2", "3", "4", "5" in a database management system) using the residual machine capacity,
considering a stage j, let the set S be the collection of stages competing for machine group Mj, $$\text{Target (for low priority lots)} = \begin{cases} UB - \text{Target}_j, \text{ if } \Sigma\ UB - \text{Target}_{j'} \leq C'mj,\ j' \in S \\ \text{(where } C'mj \text{ is the residual machine capacity of } mj) \\ C'mjX \dfrac{UB - \text{Target}_j}{\Sigma\ UB - \text{Target}_{j'}(j' \in S)}, \end{cases}$$

otherwise the number of machines allocated to stage j in a day is $$nj = \frac{\text{target}_j}{Cmj} \times Nmj$$

$$\text{Target}_j = \text{TGT}_{HPL} + \text{TGT}_{LPL}$$

where $\text{TGT}_{HPL}$: Target for high priority lots $\text{TGT}_{LPL}$: Target for low priority lots, given the stages of penetration of each stage in the line, identify the up-stream stages whose Work in Process (WIP) may flow into each stage j within the day;

then sum up WIPs of stage j and its upstream stages as an estimate of the WIP penetration limit for the stage which the daily target of stage j should not exceed; so, all targets (Target j; j=1 . . . J) are then modified; and $w_j$: WIP level for type-i at stage j;

Cj: machine capacity i terms of number of machines allocated to process type-i wafers at stage j during a day;

τj: processing time (in hours) for type-i at stage j;

t jk: time, needed for all the wafers for type i at stage j to be completed at stage k, k>j, and executing SOPEA.

8. A method in accordance with claim 5 including the steps of limiting stages of penetration as determined by said computer, as follows:

given the stages of penetration of each stage in the line, identify the up-stream stages whose Work in Process (WIP) may flow into each stage j within the day;

then sum up WIPs of stage j and its upstream stages as an estimate of the WIP penetration limit for the stage which the daily target of stage j should not exceed; so, all targets (Target j; j=1 . . . J) are then modified; and $w_j$: WIP level for type-i at stage j;

Cj: machine capacity in terms of number of machines allocated to process type-i wafers at stage j during a day;

τj: processing time (in hours) for type-i at stage j;

t jk: time, needed for all the wafers for type i at stage j to be completed at stage k, k>j.

9. A method in accordance with claim 5 including the steps as follows:

iterating the TG&MA_PR method comprising:
Step 1. Prioritize Lots
High Priority Lot: priority "1" in database management system
Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

10. A method in accordance with claim 8 including the steps as follows:

iterating the TG&MA_PR method comprising:
Step 1. Prioritize Lots
High Priority Lot: priority "1" in database management system
Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

11. A data processing system including a data base computer system and a resource allocation computer for control of resource allocation in a manufacturing plant with a manufacturing line comprising a plurality of stages with manufacturing machines, the resource allocation computer including data storage means, the system includes as follows:
- means for deriving data from the data storage means and computing the targets for each of the stages stage;
- means for obtaining machine capacity data from the data storage means and employing the machine capacity data for allocating machine capacity proportionally and adjusting targets;
- means for adding limits to stages of penetration and adjusting targets;
- means for determining residual capacity and allocating the residual capacity of the manufacturing machines; and
- means for checking the convergence of targets and machine allocation until convergence is achieved,
- means for determining the push target,
- means for determining the pull target,
- means for determining the upper bound target,
- means for determining the capacity constraint and machine allocation,
- limiting the stages of penetration,
- iterating the Target Generation and Machine Allocation and PRiority (TG&MA PR), and
- executing the Stages Of PEnetrAtion (SOPEA) method.

12. A system in accordance with claim 11 including the steps of as follows:
- means for determining the push target, wherein said push target is determined by computer using the equation as follows:

Push-Target$_j$=max(0, wip$_j$+flow_in$_j$−std_wip$_j$);

for $j=1, \ldots J$ (1) where: flow_in$_1$=$r_o$ (wafer release) and flow_in$_{j+1}$=Target$_j$($n$−1); for $j=1, \ldots J$−1 and the superscript index ($n$−1) refers to the previous iteration, and

- means for determining the pull target, wherein said pull target is determined by computer using the equation as follows:

Pull-Target$_j$=max(0, flow_out$_{j+i}$+std_wip$_{j+1}$−wip$_{j+i}$) for $j$=J−1, ... 1 where: flow_out$_j$=d$_j$ (demand for output wafers for the day), and flow_out$_j$=Target$_j$(n−1);

for j=J, ... 2 and the superscript index (n−1) refers to the previous iteration.

13. A system in accordance with claim 12 including means for determining the upper bound target by computer using the equation as follows:

UB_target$_j$=max (Pull-Target$_j$, Push-Target$_j$).

14. A system in accordance with claim 12 including means for iterating TG&M_PR comprising:
Step 1. Prioritize Lots
  High Priority Lot: priority "1" in database management system
  Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

15. A system in accordance with claim 13 including means for determining capacity constraint and machine allocation by computer, as follows:
- means for applying UB-Target to high priority lots (having a higher priority of "1" in database management system),
- means for applying UB-Target to low priority lots (having lesser priorities of "2", "3", "4", "5" in a database management system) using the residual machine capacity,
- considering a stage j, let the set S be the collection of stages competing for machine group Mj, $$\text{Target (for low priority lots)} = \begin{cases} UB - \text{Target}_j, \text{ if } \Sigma\, UB - \text{Target}_{j'} \leq C'mj,\ j' \epsilon S \\ \text{(where } C'mj \text{ is the residual machine capacity of } mj) \\ C'mjX \dfrac{UB - \text{Target}_j}{\Sigma UB - \text{Target}_{j'}(j' \epsilon S)} \end{cases},$$

otherwise the number of machines allocated to stage j in a day is $$nj = \frac{\text{target}_j}{Cmj} \times Nmj$$

Targetj=TGT$_{HPL}$+TGT$_{LPL}$ where
  TGT$_{HPL}$: Target for high priority lots
  TGT$_{LPL}$: Target for low priority lots.

16. A system in accordance with claim 13 including means for iterating the TG&MA_PR performing the steps comprising:
Step 1. Prioritize Lots
  High Priority Lot: priority "1" in database management system
  Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

17. A system in accordance with claim 13 including the steps as follows:
- means for applying UB-Target to high priority lots (having a higher priority of "1" in database management system),
- means for applying UB-Target to low priority lots (having lesser priorities of "2", "3", "4", "5" in a database management system) using the residual machine capacity,
- considering a stage j, let the set S be the collection of stages competing for machine group Mj, $$\text{Target (for low priority lots)} = \begin{cases} UB - \text{Target}_j, \text{ if } \Sigma\ UB - \text{Target}_j' \leq C'mj,\ j' \epsilon S \\ C'mjX \dfrac{UB - \text{Target}_j}{\Sigma UB - \text{Target}_{j'}(j' \epsilon S)} \text{ (where } C'mj \text{ is the residual machine capacity of } mj\text{)} \end{cases}$$

otherwise the number of machines allocated to stage j in a day is $$nj = \dfrac{\text{target}_j}{Cmj} \times Nmj$$

$$\text{Target}j = \text{TGT}_{HPL} + \text{TGT}_{LPL}$$

where
- $\text{TGT}_{HPL}$: Target for high priority lots
- $\text{TGT}_{LPL}$: Target for low priority lots,
- given the stages of penetration of each stage in the line, identify the up-stream stages whose Work in Process (WIP) may flow into each stage j within the day;
- then sum up WIPs of stage j and its upstream stages as an estimate of the WIP penetration limit for the stage which the daily target of stage j should not exceed; so, all targets (Target j; j=1 . . . J) are then modified; and
- $w_j$: WIP level for type-i at stage j;
- Cj: machine capacity in terms of number of machines allocated to process type-i wafers at stage j during a day.
- τj: processing time (in hours) for type-i at stage j;
- t jk: time, needed for all the wafers for type i at stage j to be completed at stage k, k>j, and
- executing SOPEA.

18. A method in accordance with claim 17 including the steps as follows:
iterating the TG&MA_PR method comprising:
Step 1. Prioritize Lots
High Priority Lot: priority "1" in database management system
Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

19. A system in accordance with claim 15 including means for limiting stages of penetration as determined by said computer, as follows:
given the stages of penetration of each stage in the line, means for identifying the up-stream stages whose Work in Process (WIP) may flow into each stage j within the day;
means for summing up WIPs of stage j and its up-stream stages as an estimate of the WIP penetration limit for the stage which the daily target of stage j should not exceed; so, all targets (Target j; j=1 . . . J) are then modified; and
$w_j$: WIP level for type-i at stage j;
Cj: machine capacity in terms of number of machines allocated to process type-i wafers at stagej during a day;
τj: processing time (in hours) for type-i at stage j;
t jk: time, needed for all the wafers for type i at stage j to be completed at stage k, k>j.

20. A system in accordance with claim 15 including means for iterating the TG&MA_PR method comprising:
Step 1. Prioritize Lots
High Priority Lot: priority "1" in database management system
Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

21. A system in accordance with claim 19 including the steps as follows:
means for iterating the TG&MA_PR performing the steps comprising:
Step 1. Prioritize Lots
High Priority Lot: priority "1" in database management system
Low Priority Lot: priority "2", "3", "4", "5" in database management system,
Step 2. Calculate Upper_Bound Target by technology, stage and priority,
Step 3. Apply TG&MA_PR to high priority lots,
Step 4. Apply TG&MA_PR to low priority lots using residual machine capacity,
Step 5. Apply SOPEA_PR to Compute Stages of penetration Flow-In, and
Step 6. Iterate from step 2 to step 5.

22. A computer implemented method for control of resource allocation on a manufacturing line comprising a plurality of stages of manufacturing machines, the method including the steps as follows:
determining the targets for each of the stages;
obtaining machine capacity data and employing the machine capacity data for allocating machine capacity proportionally and adjusting the targets;
adding limits to stages of penetration and adjusting the targets;
determining residual capacity and allocating the residual capacity of the manufacturing machines;
checking the convergence of targets and machine allocation until convergence is achieved,
determining the push target,
determining the pull target,
determining the upper bound target,
determining the capacity constraint and machine allocation,
limiting the stages of penetration,
iterating the Target Generation and Machine Allocation and PRiority (TG&MA PR), and
executing the Stages Of PEnetrAtion (SOPEA) method.

23. A method in accordance with claim 22 including the steps of as follows:
determining the push target, wherein said push target is determined by computer using the equation as follows:

$$\text{Push-Target}_j = \max(0, \text{wip}_j + \text{flow\_in}_j - \text{std\_wip}_j);$$

for $j=1, \ldots J$ (1) where: flow__$in_1 = r_o$ (wafer release) and flow__$in_{j+1}$=Target$_j(n-1)$; for $j=1, \ldots J-1$ and the superscript index $(n-1)$ refers to the previous iteration, and determining the pull target, wherein said pull target is determined by computer using the equation as follows:

Pull-Target$_j$=max(0, flow__out$_{j+i}$+std__wip$_{j+1}$−wip$_{j+i}$) for $j=J-1, \ldots 1$ where: flow__out$_j$=$d_j$ (demand for output wafers for the day), and flow__out$_j$=Target$_j$(n−1);

for j=J, . . . 2 and the superscript index (n−1) refers to the previous iteration.

24. A method in accordance with claim 23 including determining the upper bound target by computer using the equation as follows:

UB__target$_j$=max (Pull-Target$_j$, Push-Target$_j$).

25. A method in accordance with claim 24 including the steps of determining capacity constraint and machine allocation by computer, as follows:

applying UB-Target to high priority lots (having a higher priority of "1" in database management system), applying UB-Target to low priority lots (having lesser priorities of "2", "3", "4", "5" in a database management system) using the residual machine capacity, considering a stage j, let the set S be the collection of stages competing for machine group Mj, $$\text{Target (for low priority lots)} = \begin{vmatrix} UB - \text{Target}_j, \text{ if } \Sigma\ UB - \text{Target}_j' \leq C'mj, j'\epsilon S \\ \text{(where } C'mj \text{ is the residual machine capacity of } mj\text{)} \\ C'mjX \dfrac{UB - \text{Target}_j}{\Sigma UB - \text{Target}_j'(j'\epsilon S)} \end{vmatrix},$$

Otherwise the number of machines allocated to stage j in a day is $$nj = \dfrac{\text{target}_j}{Cmj} \times Nmj$$

Target$j$=TGT$_{HPL}$+TGT$_{LPL}$ where

TGT$_{HLP}$: Target for high priority lots

TGT$_{LPL}$: Target for low priority lots.

26. A method in accordance with claim 24 including the steps as follows:

iterating the TG&MA__PR method comprising:
Step 1. Prioritize Lots
High Priority Lot: priority "1" in database management system
Low Priority Lot: priority "2", "3", "4", "5" in database management system,
Step 2. Calculate Upper__Bound Target by technology, stage and priority,
Step 3. Apply TG&MA__PR to high priority lots,
Step 4. Apply TG&MA__PR to low priority lots using residual machine capacity,
Step 5. Apply SOPEA__PR to Compute Stages of penetration Flow-In, and Step 6. Iterate from step 2 to step 5.

27. A method in accordance with claim 25 including the steps of limiting stages of penetration as determined by said computer, as follows:

given the stages of penetration of each stage in the line, identify the up-stream stages whose Work in Process (WIP) may flow into each stage j within the day;

then sum up WIPs of stage j and its upstream stages as an estimate of the WIP penetration limit for the stage which the daily target of stage j should not exceed; so, all targets (Target j; j=1 . . . J) are then modified; and w$_j$: WIP level for type-i at stage j;

Cj: machine capacity in terms of number of machines allocated to process type-i wafers at stage j during a day.

τj: processing time (in hours) for type-i at stage j;

t jk: time, needed for all the wafers for type i at stage j to be completed at stage k, k>j.

28. A method in accordance with claim 25 including the steps as follows:

iterating the TG&MA__PR method comprising:
Step 1. Prioritize Lots
High Priority Lot: priority "1" in database management system
Low Priority Lot: priority "2", "3", "4", "5" in database management system,
Step 2. Calculate Upper__Bound Target by technology, stage and priority,
Step 3. Apply TG&MA__PR to high priority lots,
Step 4. Apply TG&MA__PR to low priority lots using residual machine capacity,
Step 5. Apply SOPEA__PR to Compute Stages of penetration Flow-In, and
Step 6. Iterate from step 2 to step 5.

29. A method in accordance with claim 27 including the steps as follows:

iterating the TG&MA__PR method comprising:
Step 1. Prioritize Lots
High Priority Lot: priority "1" in database management system
Low Priority Lot: priority "2", "3", "4", "5" in database management system,
Step 2. Calculate Upper__Bound Target by technology, stage and priority,
Step 3. Apply TG&MA__PR to high priority lots,
Step 4. Apply TG&MA__PR to low priority lots using residual machine capacity,
Step 5. Apply SOPEA__PR to Compute Stages of penetration Flow-In, and
Step 6. Iterate from step 2 to step 5.

30. A method in accordance with claim 27 including the steps as follows:

applying UB-Target to high priority lots (having a higher priority of "1" in database management system), applying UB-Target to low priority lots (having lesser priorities of "2", "3", "4", "5" in a database management system) using the residual machine capacity, considering a stage j, let the set S be the collection of stages competing for machine group Mj, $UB - \text{Target}_j$, if $\Sigma\ UB - \text{Target}_j' \leq C'mj, j'\epsilon S$ $$\text{Target (for low priority lots)} = \begin{vmatrix} \text{(where } C'mj \text{ is the residual machine capacity of } mj\text{)} \\ C'mj X \frac{UB - \text{Target}_j}{\Sigma \ UB - \text{Target}_{j'}(j' \in S)} \end{vmatrix},$$

otherwise the number of machines allocated to stage j in a day is $$nj = \frac{\text{target}_j}{Cmj} \times Nmj$$

$$\text{Target}j = \text{TGT}_{HPL} + \text{TGT}_{LPL}$$

where $\text{TGT}_{HPL}$: Target for high priority lots $\text{TGT}_{LPL}$: Target for low priority lots, given the stages of penetration of each stage in the line, identify the up-stream stages whose Work in Process (WIP) may flow into each stage j within the day;

then sum up WIPs of stage j and its upstream stages as an estimate of the WIP penetration limit for the stage which the daily target of stage j should not exceed; so, all targets (Target j; j=1 . . . J) are then modified; and $w_j$: WIP level for type-i at stage j;

Cj: machine capacity in terms of number of machines allocated to process type-i wafers at stage j during a day;

τj : processing time (in hours) for type-i at stage j;

t jk: time, needed for all the wafers for type i at stage j to be completed at stage k, k>j, and executing SOPEA.

* * * * *